United States Patent
Schulz et al.

(10) Patent No.: US 10,400,912 B2
(45) Date of Patent: Sep. 3, 2019

(54) PILOT-OPERATED DIRECTIONAL CONTROL VALVE

(71) Applicant: HYDAC FLUIDTECHNIK GMBH, Sulzbach/Saar (DE)

(72) Inventors: Frank Schulz, Blieskastel-Bierbach (DE); Markus Bill, Heusweiler (DE)

(73) Assignee: HYDAC FLUIDTECHNIK GMBH, Sulzbach/Saar (DE)

(*) Notice: Subject to any disclaimer, the term of this patent is extended or adjusted under 35 U.S.C. 154(b) by 0 days.

(21) Appl. No.: 15/520,107

(22) PCT Filed: Oct. 14, 2015

(86) PCT No.: PCT/EP2015/002027
§ 371 (c)(1),
(2) Date: Apr. 19, 2017

(87) PCT Pub. No.: WO2016/062383
PCT Pub. Date: Apr. 28, 2016

(65) Prior Publication Data
US 2017/0321820 A1    Nov. 9, 2017

(30) Foreign Application Priority Data
Oct. 22, 2014   (DE) .................. 10 2014 015 704

(51) Int. Cl.
*F16K 31/40*    (2006.01)
(52) U.S. Cl.
CPC .......... *F16K 31/408* (2013.01); *F16K 31/406* (2013.01)
(58) Field of Classification Search
CPC ........................... F15B 13/0435; F16K 31/408

USPC ...................... 137/625.64; 251/30.01, 30.02
See application file for complete search history.

(56) References Cited

U.S. PATENT DOCUMENTS

| | | | |
|---|---|---|---|
| 5,072,752 A * | 12/1991 | Kolchinsky | F16K 31/406 137/491 |
| 5,938,170 A | 8/1999 | Shimada et al. | |
| 2004/0195532 A1 | 10/2004 | Barber et al. | |
| 2005/0016168 A1 | 1/2005 | Singh | |
| 2007/0169826 A1 | 7/2007 | Hillesheim et al. | |
| 2007/0290152 A1 | 12/2007 | Ma et al. | |

(Continued)

FOREIGN PATENT DOCUMENTS

| | | |
|---|---|---|
| DE | 42 18 894 | 12/1992 |
| DE | 691 27 806 | 1/1998 |

(Continued)

OTHER PUBLICATIONS

International Search Report (ISR) dated Feb. 15, 2016 in International (PCT) Application No. PCT/EP2015/002027.

Primary Examiner — Marina A Tietjen
Assistant Examiner — Paul J Gray
(74) Attorney, Agent, or Firm — Wenderoth, Lind & Ponack, L.L.P.

(57) ABSTRACT

A pilot-controlled directional control valve, in particular a directional poppet valve, has a valve housing (10), at least three fluid connection points (12, 14, 16), a main control stage (18) and a pilot control stage. A further fluid-controlling intermediate stage (22) is arranged between the main control stage (18) and the pilot control stage (20). The main control stage (18) has a longitudinally movable main control piston (24). The pilot control stage has a longitudinally movable pilot control piston (26).

16 Claims, 1 Drawing Sheet

(56) References Cited

U.S. PATENT DOCUMENTS

2010/0155633 A1 6/2010 Pfaff
2011/0297856 A1* 12/2011 Bill .................... F15B 13/0433
251/129.15

FOREIGN PATENT DOCUMENTS

| DE | 101 06 892 | 9/2002 |
|----|------------|--------|
| DE | 10 2009 051 574 | 5/2011 |
| DE | 10 2012 006 681 | 10/2013 |

* cited by examiner

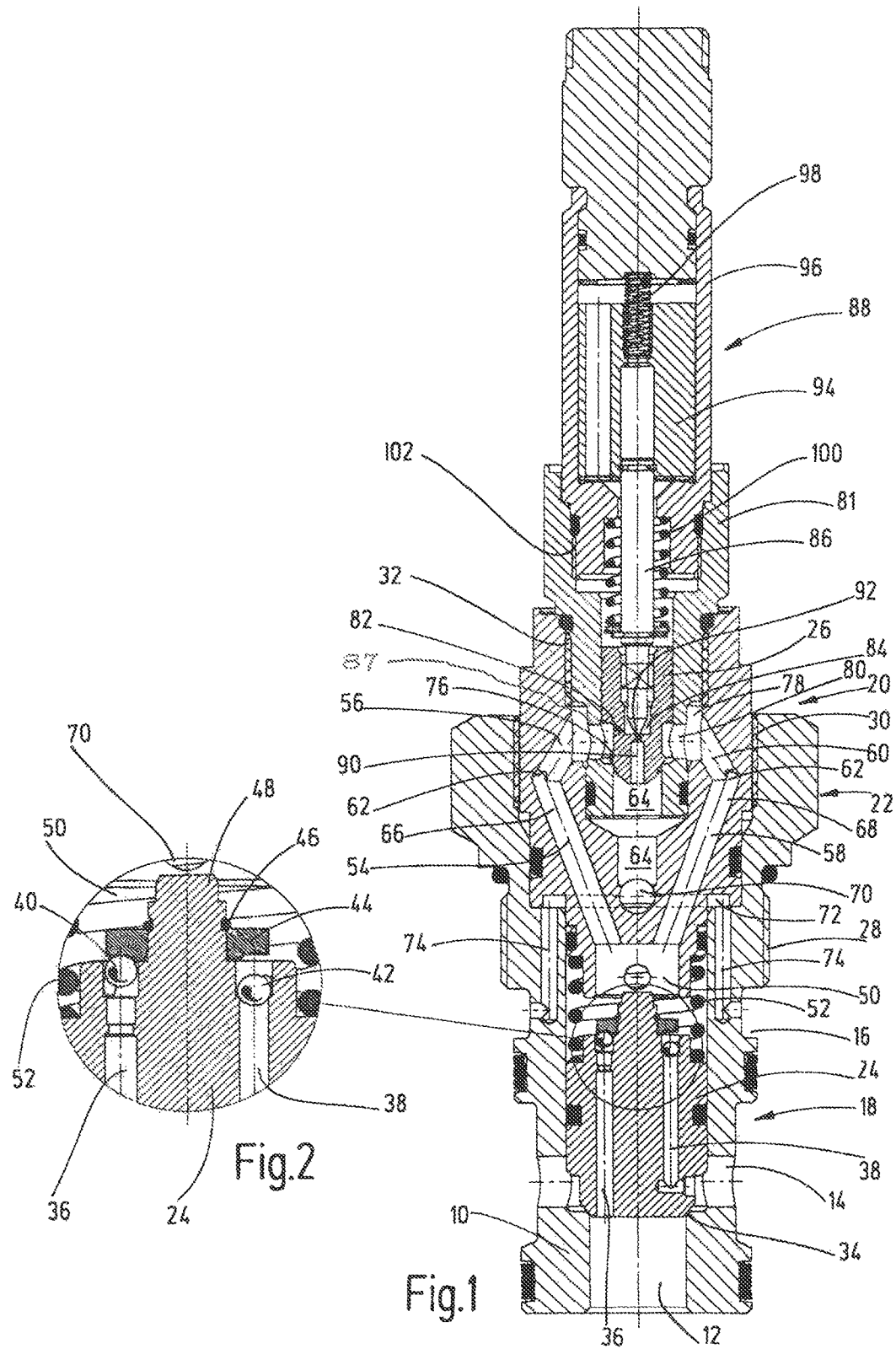

ered to the tank, for example a tank end, for example of the third fluid connection point, will prevent the valve from malfunctioning.

PILOT-OPERATED DIRECTIONAL CONTROL VALVE

FIELD OF THE INVENTION

The invention concerns a pilot-operated directional control valve, in particular a directional poppet valve, with a valve housing, with at least three fluid connection points and with a main control stage and a pilot control stage.

BACKGROUND OF THE INVENTION

DE 10 2009 051 574 A1 discloses a solenoid valve for controlling a fluid, comprising a first housing section with an axial guide for a solenoid armature. The solenoid armature is moveable in axial direction under the effect of a solenoid coil that surrounds the first housing section on the outside at least partially, with an energy storage device and with an actuator acting on a valve closing member. Due to the fact that in the known solution the valve closing member comprises a non-return valve for controlling a bypass bore in the valve closing member, the housing of the non-return valve holds a non-return valve closing member and keeps the closing member moveable, and is formed in one piece with the valve closing member. The housing, due to a form change after insertion of the non-return valve closing member, retains the non-return valve closing member in its respective functional position. A solenoid valve of this kind may be made more simply due to the above-described design of the non-return valve housing, in particular with respect to the required manufacturing tolerances.

The known solenoid valve solution comprises a main control stage and a pilot control stage that controls the main control stage. The pilot control stage can be operated via the armature that forms part of a magnet actuating system. Such solenoid valves or directional control valves are used essentially in fluid systems for controlling flow rates.

Pilot-operated directional control valves are particularly well suited for switching high pressures and high flow rates since the flow forces and the friction forces can be compensated for to a large extent. Overall, an excellent ratio of installation space to flow resistance is achieved when utilizing a pilot control stage for controlling the main control stage so that a high level of performance at a small installation space is achieved. Moreover, the switching time of the valves through the pilot control stage can be influenced. Pilot-operated directional control valves in poppet valve design are cost-effective and provide high hydraulic performance at the same time.

Pilot-operated directional control valves today are usually fitted with a pilot control stage, as described in DE 10 2009 051 574 A1, in order to achieve the required switching performance. The usual requirements are high pressure, for example, >350 bar and a high flow rate of, for example, >200 l/min at a pressure differential of approximately 5 bar. Particularly in instances where the application requires a very high dynamic performance, such as is required, for example, for emergency switching functions or for isolating switches, very high valve dynamics are required.

The above described and known solenoid valve solution is designed as a kind of screw-in cartridge valve for installation into an overall valve block. This solution may be then used advantageously and space-savingly in a modular valve design. The only disadvantage of the known solution is that it cannot meet the requirements for high switching performance and high valve dynamics.

SUMMARY OF THE INVENTION

Based upon the prior art an object of the invention to provide an improved pilot-operated directional control valve, in particular in form of a directional poppet valve, which offers an exceptionally high switching performance and high valve dynamics, is reliable in operation and can be manufactured cost-effectively.

This object is basically achieved by a pilot operated directional control valve, according to the invention, where a further fluid-controlling intermediate stage is disposed between the main control stage and the pilot control stage, and where the main control stage and the pilot control stage are provided with a longitudinally moveable main control piston and pilot control piston respectively. An installation space-saving valve design can then be provided with a kind of three-stage control assembly. As a result of the intermediate stage, very high flow rates can be controlled via the pilot control stage so that an exceptionally high valve dynamic can be achieved. In particular the fluid in form of hydraulic oil can be discharged obstruction-free and essentially resistance-free via the intermediate stage and the pilot control stage to the tank end. With the ability to manage high flow rates, as mentioned above, a very high switching performance is achieved through a relatively small 3-stage directional poppet valve assembly. This structure and operation is without parallel in the prior art.

In a particularly preferred embodiment of the directional control valve, the valve housing is attached to the valve block in a way similar to a screw cartridge that comprises fluid passages. The valve block passages may be brought into fluid-conducting alignment with the fluid connection points of the valve housing. The intermediate stage may be integrated in the valve housing in a manner similar to a second screw cartridge. The pilot control stage may be integrated in a manner similar to a third screw cartridge in the intermediate stage. Preferably, moreover, the diameters of the respective receiving thread portions become smaller, starting from the valve housing in the direction towards the pilot control stage.

This design permits an overall modular assembly with screw cartridges as cartridge valve assembly system, and permits a modular assembly of the individual components of the directional control valve comprising the main control stage, the pilot control stage and the intermediate stage located in between. Depending upon the desired performance of the directional control valve different valve components can be easily combined with varying performance characteristics using the individual components in form of screw cartridges, making implementing fluid control tasks reliably and cost-effectively in a wide range of applications.

In a further preferred embodiment of the directional control valve solution according to the invention, the main piston of the main piston stage is provided with at least two fluid passages. Each fluid passage is provided with a valve, preferably in form of a non-return valve. Each non-return valve passes the respective highest fluid pressure from two fluid connection points of the valve housing. The fluid connection points are separable from each other by the main control piston, into a discharge space, which is connected to the third fluid connection point via the controlling intermediate stage when the pilot control stage is activated. The third fluid connection point is preferably at tank pressure or ambient pressure. Thus, the respective highest pressure is applied via the non-return valves to the rear end of the main control piston. The main control piston is forced by the applied pressure and, if applicable, under the influence of an additional energy storage device, for example a compression spring, into its valve seat in the valve housing. The otherwise open fluid connection between the two fluid connection points is then tightly closed at the valve seat.

In a further preferred embodiment of the directional control valve according to the invention, individual passage sections are disposed in the intermediate stage, which meet in pairs at a kink point or deflection point so as to create a center space. The center space is permanently connected to the third fluid connection point and may be shut off by the pilot control piston of the pilot control stage. Preferably, the passage sections that are connected in pairs at the assigned kink point form a bypass passage, which terminates with its one free end in the venting space and with its other free end in a pilot control space of the pilot control stage.

This arrangement achieves that the fluid is able to flow via the intermediate stage in a space-saving manner via the relatively large-dimensioned bypass passage within the intermediate stage. Very high fluid flow rates can then be controlled via the pilot control stage, which is conducive to the high switching performance and the high valve dynamic that are demanded.

Particularly, advantageously, the surface ratio of main control piston and pilot control piston is chosen such that the sum of the pressure-active piston areas at the front end of the respective control piston corresponds to the pressure-active overall area at the rear end of the control piston. In this manner in two stages an overall large valve opening area can be generated where the fluid pressure collapses quickly to enhance the high internal dynamics of the valve according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that show the invention in principle and not to scale:

FIG. 1 is a side view in section through the pilot-operated directional control valve as a whole according to an exemplary embodiment of the invention; and FIG. 2 is an enlarged, partial side view in section of a detail in the circle of FIG. 1.

DETAILED DESCRIPTION OF THE INVENTION

The pilot-operated directional control valve shown in FIG. 1 is designed in form of a directional poppet valve, which comprises a valve housing 10 with at least three fluid connection points 12, 14 and 16 and a main control stage 18 as well as a pilot control stage 20. The fluid connection points 12 and 14 may firstly form a pressure supply connection for the purpose of connecting a pressure supply source and secondly a consumer connection for attaching a hydraulic consumer. Depending on the respective pressure situation concerning the pressure supply source and/or the hydraulic consumer, the higher pressure may be present either at the fluid connection 12 or at the fluid connection 14. The third fluid connection 16 forms a tank or return connection, thus causing a tank pressure or ambient pressure to be present at the fluid connection point 16.

An intermediate stage 22 is disposed between the main control stage 18 and the pilot control stage 20. The main control stage 18 as well as the pilot control stage 20 are provided with a longitudinally moveable main control piston 24 and a longitudinally moveable pilot control piston 26, respectively. Moreover, as shown in particular in FIG. 1, the intermediate stage 22 is located stationary in valve housing 10 and is at least in part integrated with its underside into valve housing 10.

The valve housing 10 can be received, similar to a screw cartridge, in a not depicted valve block with fluid passages, which can be brought into fluid-conducting alignment with the respective fluid connection points 12, 14, 16 of the valve housing 10. The intermediate stage 22 is, analogously, made in the shape of a further, second screw cartridge that can be received in valve housing 10 in the same manner as the first screw cartridge. Furthermore, the pilot control stage 20 may also be received as a further, third screw cartridge in the intermediate stage 22. The technical terminology for such a screw cartridge solution is called a "cartridge valve assembly". The diameters of the respective receiving thread portions 28, 30, 32 diminish in diameter, starting from the valve housing 10 towards the pilot control stage 20, at approximately the same axial thread insertion length. When observing FIG. 1 the diameter of the valve housing 10 increases in steps from the bottom upwards. The individual fluid connection points 12, 14, 16 are separated from each other through ring-shaped seals in the usual manner (thus not described in detail) as soon as the valve housing 10 is screwed into the not-depicted valve block of an overall hydraulic system.

According to the representation shown in FIG. 1, the main control piston 24 is located in its sealing position in which the two fluid connection points 12, 14 are sealed off from each other. The valve seat 34 is formed through conical surfaces at the lower, free end face of the main control piston 24 as well as the associated wall sections of the valve housing 10 that surround the fluid connection point 12.

The main control piston 24 of the main control stage 18 comprises at least two passages 36, 38, each of which is provided with a non-return valve 40, 42, as is most apparent from the representation in FIG. 2. When viewing FIGS. 1 and 2, the non-return valve 40 shown on the left with its valve ball is depicted in an open position, whereas the non-return valve 42, shown on the right, with its valve ball located in a ball seat of the main control piston 24, is shown in the closed position. So that the valve balls of the non-return valves 40, 42 are unable to leave the respective passage 36 and 38 in their open position, a disk-like valve end stop 44 is provided at the end and is retained via a circlip 46 at the upper free end of the main control piston 24, which ends in a trunnion-shaped extension 48.

The upper free ends of the two passages 36, 38 terminate in a common venting space 50, which is at the lower end of the intermediate stage 22 and at least partially surrounded by the housing components of the intermediate stage 22. Along an outer section of the venting space 50 an energy storage device in form of a first compression spring 52 extends. Spring 52 is braced with its free upper end against the intermediate stage 22 arranged stationary in valve housing 10, and with its other free lower end against the main control piston 24. Control piston 24 is guided longitudinally moveable in valve housing 10. Moreover, the intermediate stage 22 is provided with individual passage sections 54, 56; 58, 60, which meet up in pairs at a kink point 62 so as to create room for a center space 64. Center space 64 has a permanent open fluid connection to the third fluid connection point 16. Center space 64 may be shut off by the pilot control piston 26 of the pilot control stage 20 and a shut-off member of an actuator 86 described below in more detail.

The bypass passages 66, 68 are formed by the individual passage sections 54, 56; 58, 60, and enclose "bow-leg-shaped" the center space 64. Center space 64, at its lower point, as viewed in FIG. 1, is provided with a collector passage 70. Collector passage 70 terminates in a transverse passage 72, which in turn has a permanent open fluid connection to two longitudinal passages 74 of valve housing 10. The longitudinal passages 74, when viewing FIG. 1, terminate at their lower ends via transverse passages at the third fluid connection point 16, at which the tank pressure or environmental pressure is present. The center space 64 itself is formed by a borehole in the intermediate stage 22. The borehole terminates in a section that is conically enlarged towards the upper end. That conically enlarged space is delimited by the lower free end face of the housing of the pilot control stage 20. The wall sections of the housing of the pilot control stage 20 that extend upwards bound sections of the center space 64. According to the depiction in FIG. 1, center space 64 is bound at the top by the lower free end face of the pilot control piston 26, which forms there, together with associated housing components of the pilot control stage 20, a second tightly sealing valve seat 76.

According to the depiction in FIG. 1, the two bypass passages 66, 68 terminate at their bottom ends in the venting space 50. They terminate at their other free upper ends in a pilot control space 78 of the pilot control stage 20. Moreover, the bypass passages 66, 68 are not limited to extend along the drawing plane, as depicted, but can be provided with additional fluid passages within the intermediate stage 22 beyond the drawing plane. The pilot control space 78 transitions at the internal circumference into boreholes 80 of the housing of the pilot control stage 20. The free opening cross-sections of boreholes 80 can also be determined by the pilot control piston 26.

In the vicinity of the boreholes 80, the pilot control piston 26 is provided with an orifice or restrictor 82, which has a permanently open fluid connection to a piston space 84 of the pilot control piston 26. Through piston space 84 a rod-shaped actuator 86 of a magnet actuating system 88 passes. When actuator 86 is operated, a fluid-conducting path is established between the pilot control space 78, the piston space 84 and the center space 64 of the intermediate stage 22. Moreover, the pilot control piston 26 is provided at its free end face facing the center space 64 with a connection passage 90 that leads out into the center space 64. The connection passage 90 with the end that faces the actuator 86 of the magnet system 88 leads out to an orifice or restrictor point 92, which is closed in the non-actuated state of the magnet system 88 by the conically-shaped shut-off member of actuator 86. In this closed state, the shut-off member of the actuator 86 seals against a valve seat of the restrictor point 92, which forms a third valve seat of the directional control valve.

Adjacent to the pilot control space 78, the pilot control piston 26 is provided with an annular piston surface 87 at which a pressure is present, which causes a force to be applied to the pilot control piston 26. This force opposes a counter-force, which is applied to the effective total rear piston surface of the pilot control piston 26 and from which the pressure that is present inside the piston space 84 results. This total rear piston surface is comprised of multiple piston surfaces, which are the annular end surface at the rear of the pilot control piston 26, a portion of the base area of a stepped blind hole inside of pilot control piston 26 through which the actuator 86 passes, and the axially effective surfaces on the wall of the blind hole between the base surface and the annular surface.

Thus the total rear surface is comprised of the circular area at the largest outer diameter of the pilot control piston 26 less the theoretical circular area that is sealed off by the shut-off member at the third valve seat, so that the theoretical circular area is not exposed to the pressure that is present inside the piston space 84.

The magnet system 88 comprises an armature 94, which is longitudinally guided inside a tubular coil former 96. The armature 94 is braced against a further energy storage device in the form of a compression spring 98 so that the magnet system 88 is provided as a "pulling magnet". That is, when applying power to a not depicted coil commonly used in such a magnet system 88, the armature 94 is moved upwards (when viewing FIG. 1) against the force of the compression spring 98 and pulls with it the rod-shaped actuator 86 that is attached to it, so that the shut-off tip disposed at the free end opens up the orifice or restrictor point 92 at the pilot control piston 26. In addition to that a further compression spring 100 is provided as an energy storage device to retain the actuator 86 in its closed position as shown in FIG. 1. The magnet system itself is attached via a thread 102 in a cartridge-shaped manner to valve hosing 81 of the pilot control stage 20, where the diameter of the additional thread 102 is reduced compared to the previous threads 28, 30, 32.

To ensure a reliable operation of the directional control valve, the surface ratio of main control piston 24 and pilot control piston 26 each must be chosen so that the sum of the pressure-exposed piston areas at the front end of the respective control piston corresponds to the pressure-exposed total area at the rear of the control piston.

To understand the operation of the pilot-operated directional control valve better, a commonly occurring functional process will now be described in detail. Originating from connection point 12 or 14, the pressure, depending on pressure level, is conducted via the non-return valves 40, 42 to the rear of the main control piston 24. Due to this pressure and through the force of compression spring 52, the piston 24 is forced into its valve seat 34, and the otherwise open fluid connection from fluid connection 14 to 16 is then tightly sealed. The pressure is simultaneously passed on via the bypass passages 66, 68 in form of angled boreholes from the venting space 50 into the pilot control space 78 of the pilot control stage 20.

In order to open the pilot control stage 20, the pressure at the rear of the main control piston 24 has to be reduced, depending on the piston surfaces, to below half of the supply pressure at connection point 12 or 14. To achieve that, the pilot control stage 20 is operated in that the shut-off member is lifted off its valve seat, i.e., the third valve seat, by the magnet actuating system 88. Since the highly pressurized piston space 84 is now connected to the center space 64, which is under tank pressure only, the pressure in piston space 84 collapses. As a result, the counter force that pushes the piston 26 into its closing direction is no longer present so that the force, caused by the still partially present pressure at the annular piston surface 87, lifts the pilot control piston 26 off its valve seat 76, i.e., the second valve seat. The very small pilot control orifice 82 prevents the pressure inside the pilot control space 78 from collapsing as quickly as in the piston space 84. Since the flow cross-section at the second valve seat 76 is relatively large, the pressure inside the venting space 50 drops very quickly so that the main control piston 24 is lifted off its valve seat 34 briefly but relatively far. This lifting results in an open fluid connection between the fluid connection points 12 and 14. Not only the fluid displaced by the main control piston 24, but also the fluid flowing through the passages 36, 38, flows via the large flow cross-section at the second valve seat 76 back to the tank and return connection 16. When the pilot control stage 20 is operated via the magnet system 88, the pressure collapses at the pilot control orifice 82, and then, also in the pilot control space 78. To that extent the center space 64 is then relieved via the third fluid connection point 16 to tank pressure or ambient pressure. Consequently, the main control piston 24, under the effect of fluid pressure at the fluid connection points 12 or 14, now moves upwards essentially only against the pressure of the compression spring 52, and then opens up a larger connection cross-section between the fluid connection points 12 and 14.

A large opening area is then created by this three-stage valve design, which causes the pressure to collapse quickly. The hydraulic medium, which must be displaced by the third stage in form of the main control stage 18, can now be discharged from the valve device without much resistance via the pilot control stage 20 and the intermediate stage 22 towards the tank end. The fact that the surface ratio used for the main control piston 24 and the pilot control piston 26 is chosen to be principally equal in terms of ratio plays a major role.

The valve according to the invention permits achieving a high valve dynamic at a high switching performance due to its three-stage design.

While one embodiment has been chosen to illustrate the invention, it will be understood by those skilled in the art that various changes and modifications can be made therein without departing from the scope of the invention as defined in the claims.

The invention claimed is:

1. A pilot-operated directional control valve, comprising:
 a valve housing having first, second and third connection points and a coupling attachable in a manner of a first cartridge in a separate valve block with fluid passages in fluid-conducting alignment with the respective connection points of said valve housing;
 a main control stage being in said valve housing and having a longitudinally moveable main control piston in said first cartridge;
 a pilot control stage being in said valve housing and having a longitudinally moveable pilot control piston in said pilot stage;
 a fluid-controlling intermediate stage being in said valve housing disposed between said main control stage and said pilot control stage and being integrated as a second cartridge threaded in said first cartridge, said pilot control stage being integrated as a third cartridge threaded in said second cartridge;
 a plurality of individual passage sections being disposed in said intermediate stage and meeting in plural pairs at respective kink or deflection points; and
 a center space being located between said individual passage sections, being permanently connected in fluid communication with said third connection point at one end thereof and being closeable by said pilot control piston of said pilot control stage at an opposite end thereof, said center space being bounded by axially extending wall sections of a pilot housing of said pilot control stage, by an adjacent free end face of said pilot control piston and by associated housing components of said third cartridge of said pilot control stage forming a valve seat tightly sealable by said pilot control piston.

2. A pilot-operated directional control valve according to claim 1 wherein
 diameters of respective receiving thread portions of said first, second and third cartridges progressively diminish from said first cartridge to said third cartridge.

3. A pilot-operated directional control valve according to claim 1 wherein
 said main control piston comprises first and second main passages, each of said main passages having a non-return valve passing a respective higher fluid pressure of said first or second connection point into a venting space connected to said third connection point via said intermediate stage when said pilot control stage is activated, said first and second connection points being separable by said main control piston.

4. A pilot-operated directional control valve according to claim 3 wherein
 said third connection point is at at least one of tank pressure or ambient pressure.

5. A pilot-operated directional control valve according to claim 3 wherein
 said plurality of individual passage sections form a bypass passage with one free end thereof terminating in said venting space and with another free end thereof in a pilot control space of said pilot control stage.

6. A pilot-operated directional control valve according to claim 1 wherein
 said center space leads out into a transverse passage leading out at an end thereof to a housing of said intermediate stage and leading into a longitudinal passage of said valve housing permanently connected to said third fluid connection point.

7. A pilot-operated directional control valve according to claim 1 wherein
 said main control valve and said pilot control valve have a surface area ratio with a sum of pressure-exposed piston areas at front ends thereof corresponding to pressure-exposed areas at rear ends thereof.

8. A pilot-operated directional control valve according to claim 2 wherein
 said individual passage sections of each of said pairs thereof are oriented at an angle to each other.

9. A pilot-operated directional control valve according to claim 2 wherein
 said center space is laterally spaced from and between said pairs of said individual passage sections.

10. A pilot-operated directional control valve according to claim 1 wherein
 said coupling is a thread.

11. A pilot-operated directional control valve according to claim 1 wherein
 said coupling is an external thread.

12. A pilot-operated directional control valve, comprising:
 a valve housing having first, second and third connection points and being attachable in a manner of a first cartridge in a valve block with fluid passages in fluid-conducting alignment with the respective fluid connection points of said valve housing;
 a main control stage being in said valve housing and having a longitudinally moveable main control piston;
 a pilot control stage being in said valve housing and having a longitudinally moveable pilot control piston, said main control piston comprises first and second main passages, each of said main passages having a non-return valve passing a respective higher fluid pressure of said first or second connection point into a venting space connected to said third connection point via said intermediate stage when said pilot control stage is activated, said first and second fluid connection points being separable by said main control piston;

a fluid-controlling intermediate stage being in said valve housing disposed between said main control stage and said pilot control stage and being integrated as a second cartridge threaded in said first cartridge, said pilot control stage being integrated as a third cartridge threaded in said second cartridge;

a plurality of individual passage sections being disposed in said intermediate stage and meeting in pairs at respective kink or deflection points, said plurality of individual passage sections form a bypass passage with one free end thereof terminating in said venting space and with another free end thereof in a pilot control space of said pilot control stage, said pilot control space being connected in fluid communication with an orifice having a permanently open fluid connection to a pilot piston space of said pilot control piston;

a center space being located between said individual passage sections, being permanently connected in fluid communication with said third fluid connection point at one end thereof and being closeable by said pilot control piston of said pilot control stage at an opposite end thereof, said center space being bounded by axially extending wall sections of a pilot housing of said pilot control stage, by an adjacent free end face of said pilot control piston and by associated housing components of said pilot control stage forming a valve seat tightly sealable by said pilot control piston; and an actuator of a magnet actuating system passes through said pilot piston space, a fluid-conducting path being established between said pilot control space and said center space of said intermediate stage when said magnet actuating system is operated.

13. A pilot-operated directional control valve according to claim 12 wherein
said pilot control piston comprises a connection passage at said adjacent free end face thereof, said connection passage leading to an orifice being at an end of said connection passage facing the actuator and being closable by said actuator in a non-actuated state of said magnet actuating system.

14. A pilot-operated directional control valve according to claim 12 wherein
said first cartridge has a cartridge coupling thereon engageable with a mating coupling on the valve block.

15. A pilot-operated directional control valve according to claim 14 wherein
said cartridge coupling is a thread.

16. A pilot-operated directional control valve according to claim 14 wherein
said cartridge coupling is an external thread.

* * * * *